(12) United States Patent
Lee et al.

(10) Patent No.: US 6,379,528 B1
(45) Date of Patent: Apr. 30, 2002

(54) ELECTROCHEMICAL MACHINING PROCESS FOR FORMING SURFACE ROUGHNESS ELEMENTS ON A GAS TURBINE SHROUD

(75) Inventors: Ching-Pang Lee, Cincinnati, OH (US); Robert Alan Johnson, Simpsonville, SC (US); Bin Wei, Mechanicville; Hsin-Pang Wang, Rexford, both of NY (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 09/734,035

(22) Filed: Dec. 12, 2000

(51) Int. Cl.$^7$ .................................................. B23H 3/00
(52) U.S. Cl. ........................ 205/640; 205/672; 205/685
(58) Field of Search ................................ 205/652, 668, 205/685, 672, 664, 640

Primary Examiner—Donald R. Valentine
Assistant Examiner—Thomas H. Parsons
(74) Attorney, Agent, or Firm—Nixon & Vanderhye

(57) ABSTRACT

The back side recessed cooling surface of a shroud defining in part the hot gas path of a turbine is electrochemically machined to provide surface roughness elements and spaces therebetween to increase the heat transfer coefficient. To accomplish this, an electrode with insulating dielectric portions and non-insulating portions is disposed in opposition to the cooling surface. By passing an electrolyte between the cooling surface and electrode and applying an electrical current between the electrode and a shroud, roughness elements and spaces therebetween are formed in the cooling surface in opposition to the insulating and non-insulating portions of the electrode, hence increasing the surface area and heat transfer coefficient of the shroud.

11 Claims, 2 Drawing Sheets

ELECTROCHEMICAL MACHINING PROCESS FOR FORMING SURFACE ROUGHNESS ELEMENTS ON A GAS TURBINE SHROUD

STATEMENT REGARDING FEDERALLY SPONSORED RESEARCH AND DEVELOPMENT

This invention was made with Government support under Contract No. DE-FC21-95MC31176 awarded by the Department of Energy. The Government has certain rights in this invention.

BACKGROUND OF THE INVENTION

1. Field of the Invention

The present invention relates to an electrochemical machining process for forming surface roughness elements on the recessed back side of a cooling surface of a gas turbine shroud.

2. Description of the Related Art

Gas turbine efficiencies are directly proportional to the temperature of the turbine gases flowing along the hot gas path and driving the turbine blades. Gas turbines typically have operating temperatures on the order of 2700° F. To withstand these high temperatures, various parts of the gas turbine require cooling. For example, the shrouds in modern high pressure turbines are typically formed to provide an enhanced cooling surface on the back side recessed portion of the shroud. It will be appreciated that an annular array of shrouds encompasses the hot gas path in the turbine and the surface of each shroud in part defining that hot gas path must be cooled. Typically, a cooling medium such as compressor discharge air or, in more advanced turbines, steam, is directed against the back side cooling surface to maintain the temperature of the shroud within acceptable limits.

In recent times, high pressure turbine shrouds have surface roughness elements cast on their back sides to increase the cooling surface area and improve the overall cooling for the shroud. For example, bumps are often cast in the back side cooling surface of the shroud to provide increased surface area and, hence, increased heat transfer from the shroud wall to the cooling medium as compared with a smooth back side cooling surface. While such cast-in bumps effectively improve the heat transfer coefficient, many older turbines do not have these enhanced cooling surfaces. While it is desirable to provide enhanced heat transfer features on the older shrouds when refurbished or returned from the field for repair, casting is not an option for providing the rough surface elements on existing shroud surfaces.

Recently, an improved electrochemical technique has been developed to provide improved heat transfer characteristics to parts requiring cooling surfaces. The technique is known as STEM (shaped tube electrochemical machining). Aspects of the STEM technique have been described in assignee's co-pending, commonly-assigned applications Ser. Nos. 60/149,616, titled "A Method and Tool for Electrochemical Machining"; 60/149,618, titled "A Method and Tool for Electrochemical Machining"; 60/149,617, titled "A Method and Tool for Electrochemical Machining"; 09/187,663, titled "A Method and Tool for Electrochemical Machining" (now U.S. Pat. No. 6,200,439); 09/187,664, titled "Process for Fabricating a Tool Used in Electrochemical Machining" (now U.S. Pat. No. 6,303,193) and 60/149,619, titled "A Method and Tool for Electrochemical Machining," the subject matters of which are incorporated herein by reference. As described in those applications, an electrode is provided having an insulating dielectric material or coating applied on the electrode surface in a pattern which, in conjunction with an electrolyte and the application of an electrical current between the electrode and the workpiece displaces, i.e., dissolves, metal from the adjacent portions of the workpiece to form projections and grooves along the workpiece surface. That is, the metallic portions of the workpiece surface directly adjacent the insulated portions of the electrode are not electrochemically removed, while the portions thereof directly adjacent the non-insulated portions of the electrode are electrochemically removed to form the grooves in the surface of the workpiece.

BRIEF SUMMARY OF THE INVENTION

In accordance with a preferred embodiment of the present invention, an electrochemical machining process is provided for forming surface roughness elements, i.e., raised elements, and spaces therebetween along a back side recessed cooling surface of a shroud, in part defining a hot gas path for a gas turbine. By forming these raised surface elements and spaces therebetween, the heat transfer characteristics of the shroud wall are significantly enhanced. To accomplish the foregoing, the present invention provides, in a preferred embodiment, an electrode, generally in the shape of the back side recessed cooling surface of the gas turbine shroud having an insulating dielectric coating along one surface thereof. Portions of the coating on the electrode surface are removed to form an array of electrical insulating portions and non-insulated portions along that surface. Particularly, the insulating and non-insulating portions of the electrode are preferably formed in a patterned array which, when the electrode surface is disposed in general opposition, lie in opposition to intended locations of the raised surface elements and spaces therebetween on the cooling surface of the shroud. That is, the retained insulated portions of the electrode surface will correspond to the locations of the raised surface elements to be formed along the back side recessed cooling surface of the shroud. The non-insulated portions of the electrode will correspond in location to the spaces to be formed between the surface elements along the back side recessed cooling surface of the shroud. By disposing the electrode with the patterned array of electrically insulating and non-insulating portions in opposition to the back side recessed cooling surface of the shroud and circulating an electrolyte between the electrode and the shroud surface, the application of an electric current between the electrode and the shroud surface electrochemically removes material along the shroud surface adjacent non-insulated portions of the electrode to form the spaces between the raised elements on the shroud surface lying opposite the insulated portions of the electrode.

In a preferred embodiment of the present invention, the electrode surface is initially entirely coated with the dielectric insulating material. Part of the coating is then removed, for example, by using a laser ablation method, to form the array which may be a random or patterned array of insulating and non-insulating portions on the electrode. Preferably, a patterned array, for example, rows and columns of the dielectric material are provided on the electrode surface. Moreover, the shape of the insulated portions or the non-insulated portions on the electrode surface determines the shape of the raised surface elements and spaces therebetween. For example, square, rectilinear, oval or circular-shaped insulating materials formed on the electrode, in turn, form correspondingly-shaped raised elements on the cooling surface of the shroud.

The insulating portions of the dielectric material on the electrode surface may approximate 0.001×0.001 inch to 0.005×0.005 inch and the non-insulated spacing may approximate 0.001 to 0.005 inch. With a patterned electrode employing insulating elements of this size processed on the shroud surface to remove 0.001 inch to 0.005 inch of material therefrom and forming the roughness elements, it will be appreciated that the surface area of the cooling surface of the shroud is substantially increased. Using those preferred sizes, the roughness elements on the cooling surface can double the heat transfer surface area. Since the surface heat transfer rate is proportional to the surface area, surface cooling can be significantly enhanced. When these roughened surfaces are used for impingement cooling, the heat transfer can be improved by at least 50%. While the electrochemical machining process hereof may be used on original equipment, it comprises a significant increase in heat transfer characteristics for the older shrouds when serviced or repaired to reduce the metal temperature and enhance the service life of the shroud.

In a preferred embodiment according to the present invention, there is provided a process for forming raised elements and spaces therebetween along a back side recessed cooling surface of a shroud in part defining a hot gas path for a gas turbine, comprising the steps of (a) locating an electrode having electrical insulating material arranged in an array along a surface thereof defining insulated and non-insulated portions of the electrode surface in general opposition to intended locations of the raised elements and spaces therebetween, respectively, on the cooling surface, (b) flowing an electrolyte between said electrode surface and the cooling surface of the shroud and (c) passing an electric current between the electrode and the shroud to form the raised elements and spaces therebetween along the cooling surface of the shroud.

DETAILED DESCRIPTION OF THE INVENTION

Figure 1:
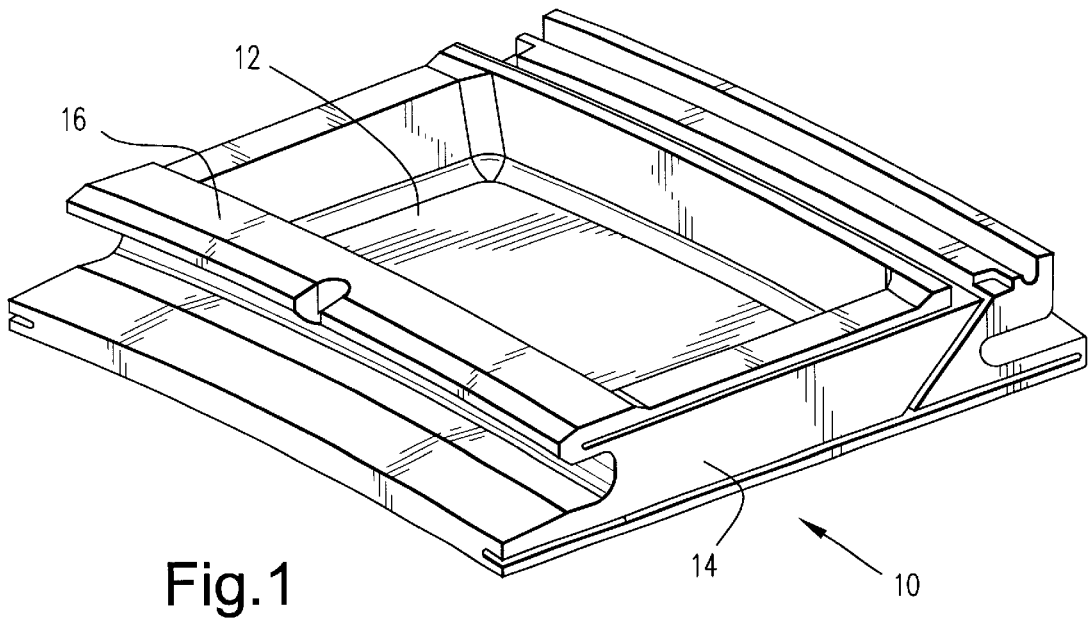
FIG. 1 is a perspective view of a prior art shroud for a gas turbine illustrating a recessed back side smooth cooling surface thereof.

Referring now to the drawings, particularly to FIG. 1, there is illustrated a prior art shroud, generally designated 10, which, in conjunction with other similar shrouds, form an annular array of shrouds in part defining the hot gas path of a gas turbine. It will be appreciated that FIG. 1 is a view of the back side of the shroud and that the opposite surface of the shroud is exposed to the hot gas path and lies directly adjacent the bucket tips of the rotor of the gas turbine. In the illustrated form, shroud 10 includes a back side recessed cooling surface 12 surrounded by side and end walls 14 and 16. In a typical arrangement, a cooling medium such as compressor discharge air or steam flows into the recess through an impingement plate, not shown, for impingement upon the cooling surface 12. As illustrated in FIG. 1, the cooling surface 12 is smooth, which is typical of the shrouds of older gas turbines. The present invention therefore provides a method for electrochemically processing the smooth surface 12 to provide enhanced heat transfer characteristics, i.e., surface roughness elements with spaces therebetween.

Figure 3:
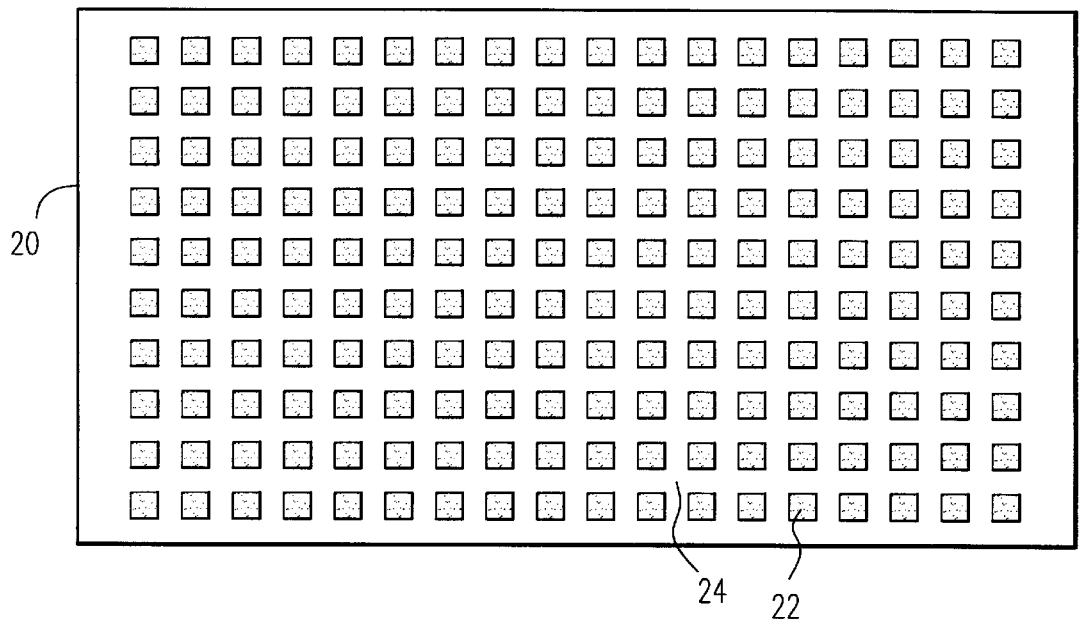
FIG. 3 is a plan view of an electrode illustrating a patterned array of insulating material formed on its surface.

Referring to FIG. 3, there is illustrated an electrode 20 in the general shape of the surface area 12 of the cooling surface of shroud 10. The electrode 20 has an array of dielectric coatings 22 defining electrically insulated portions, the spaces 24 therebetween defining non-insulated portions. Preferably, the dielectric coating is arranged in a patterned array on the surface of the electrode, although a random array can be used. For example, in the illustrated embodiment of FIG. 3, the insulated portions 22 are arranged in orthogonally related rows and columns. It will be appreciated, however, that the patterned array may be other than orthogonally related rows and columns, for example, diagonal rows. Additionally, while the insulated portions 22 are illustrated in FIG. 3 as square, it will be appreciated that the shape of the insulated portions 22 need not be square and can be other configurations, such as rectilinear, oval, circular or diamond-shaped.

To form the pattern array of dielectric material, the electrode 20 is initially coated along the entirety of its surface. Portions of the coating are then removed, for example, by laser ablation, to form the pattern of dielectrically insulated portions 22 and the non-insulated portions or spaces 24 therebetween.

Figure 4:
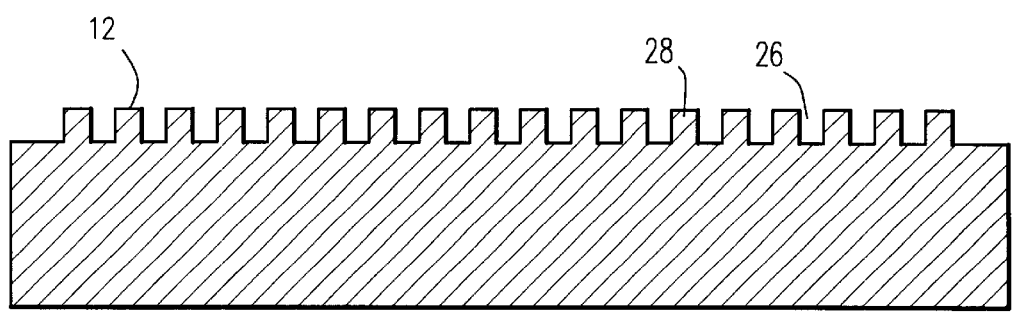
FIG. 4 is an exaggerated side cross-sectional view of the cooling surface with the surface roughness elements formed thereon using the electrode of FIG. 3.

To form raised surface elements and spaces therebetween in the surface 12 of the shroud, the electrode 20 is disposed in the recess of the shroud in opposition to the surface 12. It will be appreciated that the non-insulated portions or spaces 24 between the insulated portions 22 of the electrode cooperate with an electrolyte passed between the electrode and the surface 12 and the application of electrical current between the electrode 20 and shroud 10 to remove metal along the surface 12 directly opposite the registering exposed, non-insulated metal portions 24 to form spaces 26 between the raised elements 28 as illustrated in FIG. 4. That is, with electrolyte flowing between the electrode 20 and the surface 12 and upon application of an electrical current between electrode 20 and shroud 10, the electrically insulated portions 22 block the current flow from the electrode 20 toward the opposing surface 12 such that the metal of the surface 12 in registration with the insulated portions 22 is not removed. The current passing from the non-insulated portions or spaces 24 of electrode 20 to the opposing surface 12 dissolves the metal of the surface 12 in registration with the non-insulated portions leaving the non-dissolved metal therebetween, thereby forming the raised elements 28 and the spaces 26 between the raised elements 28.

Figure 2:
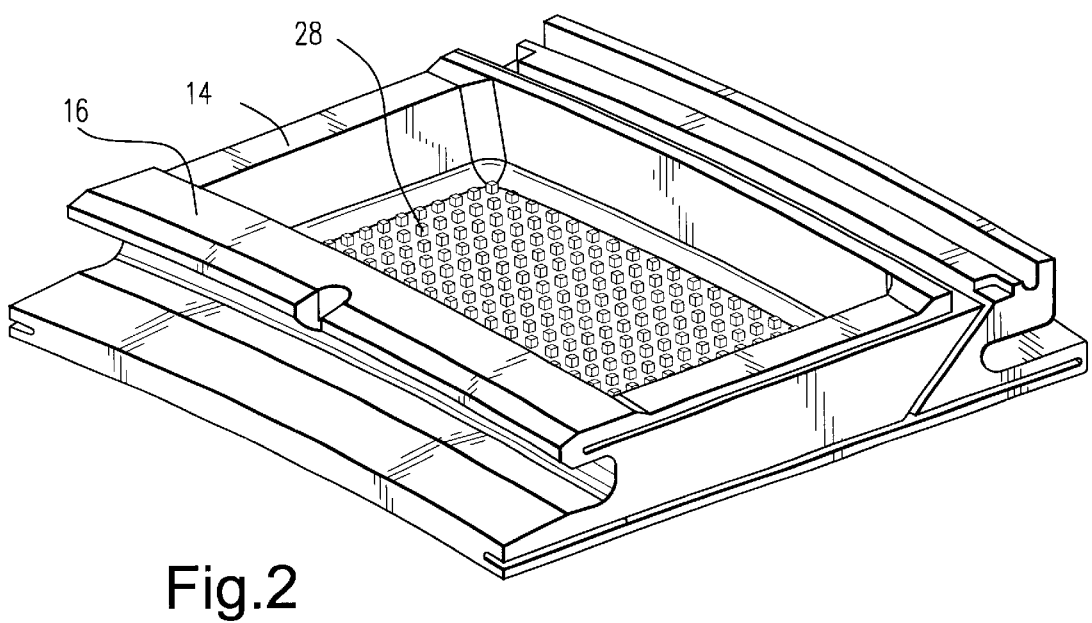
FIG. 2 is a view similar to FIG. 1 illustrating in exaggerated form surface roughness elements formed on the smooth cooling surface of the shroud in accordance with the present invention.

The surface 12 illustrated in FIG. 2 is an exaggerated showing of the raised surface elements and surfaces therebetween. The insulated portions 22 of the electrode 20, for example, are square and on the order of 0.001 by 0.001 inch to about 0.005 by 0.005 inches square. The non-insulating spacing is approximately 0.001 to 0.005 inches. Thus, the roughness elements and the spaces therebetween as illustrated in FIGS. 2 and 4 are highly exaggerated and illustrate the principle of the present invention. It will be appreciated that roughness elements as described can double the heat transfer surface area, significantly enhancing the heat transfer rate. Consequently, shrouds employed in turbines already in service without cast-in bumps to enhance cooling effects may be refurbished to provide the roughened elements and spaces therebetween to enhance the heat transfer coefficient in a manner that is efficient and cost-effective.

In the STEM techniques disclosed in the above-identified patent applications, a highly acidic electrolyte solution is employed to avoid flush channel clogging caused by metal hydroxide buildup in the narrow passages of the deep holes in which the STEM process is used. However, a less acidic electrolyte, such as a aqueous $NaNO_3$ (5–15% wt. concentration) or a NaCl solution may be used. The problem of flush channel clogging is not present for this open shallow surface machining. Also, continuous DC or pulsating DC current with a pulse duration ranging from 0.2 ms to 20 seconds at a voltage from 5V–25V can be used. Preferably, short pulse durations are used for better bump definition. Further, the tool is preferably stationary. An option, however, is to feed the tool towards the workpiece, particularly to machine deeper bumps or pins.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for forming raised elements and spaces therebetween along a back side recessed cooling surface of a shroud in part defining a hot gas path for a gas turbine, comprising the steps of:

(a) locating an electrode having electrical insulating material arranged in an array along a surface thereof defining insulated and non-insulated portions of the electrode surface in general opposition to intended locations of the raised elements and spaces therebetween, respectively, on said cooling surface;

(b) flowing an electrolyte between said electrode surface and the cooling surface of the shroud; and (c) passing an electric current between the electrode and the shroud to form the raised elements and spaces therebetween along the cooling surface of the shroud.

2. A process according to claim 1 including, prior to step (a), providing the insulating material on the surface of the electrode in a patterned array.

3. A process according to claim 1 including, prior to step (a), providing the insulating material on the surface of the electrode in a patterned array having rows and spaces between said rows.

4. A process according to claim 3, including arranging the patterned array of insulating material in orthogonally-related rows and columns thereof.

5. A process according to claim 1, including prior to step (a), providing the insulating material on the surface of the electrode in a patterned array thereof and in shapes having one of square, rectilinear, oval and circular configurations.

6. A process according to claim 5, including forming such surface elements on said cooling surface of said shroud in shapes corresponding to said one of said square, rectilinear, oval and circular configurations of said insulating material.

7. A process according to claim 1, including prior to step (a), coating the surface of the electrode with the insulating material and removing the insulating material from predetermined portions of the electrode surface at locations thereof for forming spaces between said insulating portions.

8. A process according to claim 7, including removing the insulating material from the electrode surface, leaving a patterned array of insulating material on the electrode surface, forming orthogonally-related columns and rows thereof.

9. A process according to claim 8, including removing a portion of the insulating material from the electrode surface, leaving a patterned array of insulating material with each said insulating material portion having one of said square, rectilinear, oval and circular configurations.

10. A process according to claim 1 including, prior to step (a), removing a shroud from a gas turbine, forming the raised surface elements and spaces therebetween on the cooling surface of the removed shroud by performing steps (a), (b) and (c), and replacing the shroud in the turbine.

11. A process according to claim 1 wherein the electrolyte comprises an aqueous solution of a 5–15 weight % concentration of $NaNO_3$.

* * * * *